United States Patent

[11] 3,561,598

| [72] | Inventor | Alexander S. Goldberg |
| | | 84 Locust Ave., Millburn, N.J. 07041 |
| [21] | Appl. No. | 865,499 |
| [22] | Filed | Oct. 10, 1969 |
| [45] | Patented | Feb. 9, 1971 |

[54] METHOD FOR DISPOSING OF SLUDGE FROM SEWAGE AND INDUSTRIAL WASTES
1 Claim, No Drawings

[52] U.S. Cl. .................................................... 210/10, 162/158; 210/18, 210/62;
[51] Int. Cl. .................................................... C02c 3/00
[50] Field of Search .................................. 210/10, 50, 63, 62, 152, 18; 162/158

[56] References Cited
UNITED STATES PATENTS

| 1,364,387 | 1/1921 | Landreth .................. | 210/42 |
| 1,418,013 | 5/1922 | Newman .................. | 210/50 |
| 1,876,123 | 9/1932 | Wright ...................... | 210/152 |
| 1,931,248 | 10/1933 | Bryant ...................... | 162/158X |
| 1,956,463 | 4/1934 | Lyon ......................... | 210/62X |
| 1,986,332 | 1/1935 | Fischer ..................... | 210/10X |
| 2,852,584 | 9/1958 | Komline ................... | 210/10X |

Primary Examiner—Michael Rogers
Attorney—Cifelli and Behr

ABSTRACT: An economical process for instantly disposing of sludge from sewage and industrial wastes and manufacturing a useful product therefrom, comprises reducing suspended solids in the sludge and wastes to a concentration of less than one percent by dilution to form a slurry, oxidizing the slurry, rapidly filtering the oxidized slurry and drying it on a paper making machine which rolls the dried residue onto a roller. The method eliminates odors and produces a product useful as a synthetic top soil or soil conditioner or as a paperlike product, useful for packing carton liners. The process also eliminates the previously required capital investment in digester equipment, reduces operating and chemical costs and reduces sludge to a form in which it can be inexpensively shipped or incinerated.

3,561,598

METHOD FOR DISPOSING OF SLUDGE FROM SEWAGE AND INDUSTRIAL WASTES

BACKGROUND OF THE INVENTION

This invention relates to treatment of sludge from sewage and industrial wastes.

The treatment and disposal of sludge from sewage which may comprise physiological excretion, garbage grindings, waste food and packaging materials, and industrial wastes such as process discharge wastes from paper manufacturing, brewing, slaughtering, and tanning and chemical and metallurgical processing, has presented and continues to present vexing problems in modern society. The strong public feeling against noxious odors, dumps, landfills and unsanitary conditions has placed severe restrictions on modes of treating and disposing of waste products of all types.

With respect to sewage and industrial wastes, these are ordinarily transported by water flow through pipes from their source to a treatment plant. At the treatment plant, a typical process to which they may be subjected may include (a) separation of grit by reducing the velocity of the waste-carrying water to permit settling of the suspended grit, (b) screening to remove rags, floating wood and large paper masses, (c) grinding of the separated screenings to form a ground rag sludge, (d) settling to separate raw primary sludge from primary supernatant liquid, (e) digesting, e.g. by anaerobic decomposition, the raw primary sludge, (f) filtering the digested sludge on sand filter beds or in vacuum filters, (g) drying the residue, and (h) disposing of the dried residue.

In addition to the above-outlined treatment, supplemental steps may be taken such as subjecting the primary supernatant liquid to a biological treatment to form an activated sludge which may be mixed with the raw primary sludge prior to digestion. Further, disposing of the dried residue may require barging or pumping to sea, incineration, wet-air oxidation, hot-air drying and distribution of the dried product as a fertilizer or soil conditioner, or dumping.

Known treatment and disposal processes such as that outlined above have exhibited significant disadvantages and/or objectionable characteristics. Digestion, for example, requires heavy capital investment in equipment and takes 30 to 90 days to accomplish depending upon the temperature in the digester and the nature of the wastes. Further, the known processes ordinarily result in the generation of noxious odors and air pollution.

Disposal of the treatment products where ocean dumping is not available requires expensive incineration or land filling which has become more difficult as land becomes more scarce. Use of the treatment products as soil conditioners in Western countries has been severely restricted because of both the health hazard caused by bacteria and viruses entering farm produce, and the fact that chemical fertilizers are more uniform in quality and more effective in increasing crop yields.

SUMMARY OF THE INVENTION

It is the principal object of the invention, therefore, to provide an efficient, relatively inexpensive treatment process for sludge from sewage and industrial wastes which eliminates protracted digestion, noxious odors and air pollution, and produces a product which is sterile, not offensively odoriferous, compact and dry, and commercially useful and exploitable.

The foregoing principal object as well as others which will be readily discerned by those skilled in the art is achieved by the method of the invention which may include the steps of diluting sludge from sewage and/or industrial waste to form a sludge slurry, oxidizing the sludge slurry by adding an oxidizing agent thereto to form an oxidized sludge slurry, and filtering said sludge to form a sheet of residue.

The novel product of the above-described process comprises a paperlike product which may be utilized as a soil conditioners, or as a paper product, e.g. packing carton liners, or which may be disposed of by incineration, if desired.

DETAILED DESCRIPTION

Considering now the process of the invention in detail, grit sedimentation, screening and grinding to produce ground rag sludge, settling to produce raw primary sludge, and biological treatment of primary supernatant liquid to form activated sludge may all be accomplished by known methods prior to commencement of the process of the invention.

In this regard, the invention contemplates the treatment of primary sludge which may include raw primary sludge, ground rag sludge and activated sludge, either along or in combination. Thus primary sludge, having been scraped from the bottom of settling basins or the like, is pumped to dilution tanks where it is reduced to a total solids content of 1 percent (10,000 mg./1.) to form a sludge slurry. The dilution may be accomplished by the addition of ordinary tap water in proper amounts to the primary sludge to be diluted.

The sludge slurry is thereafter pumped into an open mixing or reacting tank through a mixing pipe wherein a suitable oxidant is added to the sludge slurry. The oxidizing material may consist of commercially available hypochlorite solutions (5 to 15 percent by weight) or any suitable oxidant in dissolved form which will intimately mix with the sludge. Among those oxidizing materials found to be satisfactory is sodium hypochlorite (NaOC1) which may be introduced to the sludge slurry in any suitable manner. One method being to form the oxidant in situ by introducing appropriate quantities of caustic soda (NaOH) and chlorine ($Cl_2$) into the mixing pipe as it is being pumped into the open mixing or reacting rank. The caustic soda and chlorine react to form sodium hypochlorite which, when added in quantities ranging from 100 to 1,000 mg./1. of the chlorine equivalent of the oxidant (or 500 mg./1. for each 1 percent of total solids), provides sufficient oxidant to completely oxidize the sludge. Other satisfactory oxidants include chlorine, sodium chlorite acidified to produce chlorine dioxide, chlorine dioxide and sodium hypochlorite in combination, and hydrogen peroxide in concentrations of from 15 percent to 50 percent. Gaseous chlorine is not preferred since it tends to produce a low pH product. This in turn makes it difficult to return the filtrate to the influent sewage without causing biological shock to the biota in the secondary system, unless the filtrate is first partially neutralized to pH5, gaseous chlorine also requires additional treatment time, since it is necessary to wait for the dissolved chlorine gas to escape and this in itself is a ventilation hazard in the filtration operation of the present process. Those skilled in the art will appreciate that some of the other possible oxidants also present problems and that the preferred material is sodium hypochlorite.

In the open mixing or reacting tank, high speed mixing apparatus as well as piped recirculation equipment will ordinarily enable completion of the oxidation of the sludge in less than 10 minutes. In this regard, complete oxidation is ordinarily characterized by a change of color from black to tan or gray.

After the oxidation is complete in the reacting tank, the oxidized slurry may be analyzed to determine if further dilution is required, e.g. by dilution to 0.5—0.9 percent suspended solids, and thereafter diluted as required, or if not required, then pumped as a slurry to the feed box of a paper-making machine of known type for filtration, drying and rolling. The filtration may be accomplished through screen of virtually any mesh size that will accommodate rapid filtration. It has been found, however, that a 40 ×50 mesh screen provides satisfactory filtration and such a screen is recommended.

Upon completion of filtration, a solid sheet of residue is formed which is paperlike and fibrous in composition The solid sheet, which is quite thin, is rapidly fed through the heated drying rolls of the paper-making machine and wound on receiving rolls to obtain suitable units, e.g. 1 ton dry rolls.

The resulting product is a stable, sterile and odor-free rolled sheet which, when viewed through the microscope, has the appearance of paper fibers. The product may be used in the production of paper cartons or packing material, as insulating material or as soil conditioners, or may be incinerated if desired. Additionally, the filtrate from the process may be returned to the beginning of the sewage influent line to help reduce odors in the early stages of treatment.

EXAMPLE 1—SEWAGE SLUDGE TREATMENT

This example involves the treatment of sludge from purely domestic sewage. A primary sludge comprising combined raw primary sludge and activated sludge with a fairly consistent 4-—4.5 percent suspended solids content was diluted to 25 percent by taking a 250 ml. sample and diluting to 1 liter with tap water to form a sludge slurry.

The sludge slurry was then treated for 5 minutes with 10 ml. of 5 percent sodium hypochlorite (NaOCl) (500 mg. $Cl_2$) which turned the slurry from odorous black to a nonodorous pearl gray. Thereafter the oxidized slurry was filtered through a 40 mesh screen with vacuum. An analysis of the filtrate showed that 70.3 percent of the solids were retained as residue by the screen, most of the passed solids being activated sludge.

The residue was thereafter dried and compacted to form a paperlike product which exhibited a nitrogen content of 3.2 percent total nitrogen.

EXAMPLE 2—TREATMENT OF SLUDGE FROM COMBINED SEWAGE AND INDUSTRIAL WASTES

This example involves the treatment of sludge from a combination of domestic sewage and industrial wastes in an unknown ratio. Primary sludge was diluted to approximately 1 percent suspended solids by the addition of tap water and thereafter treated with 500 mg./l. chlorine (10 ml. NaOCl). The oxidized slurry was filtered through a 40 mesh screen and an analysis of the filtrate showed that 81.1 percent of the solids were retained as residue by the screen.

The residue was thereafter dried and compacted to form a paperlike product which exhibited a nitrogen content of 2.1 percent total nitrogen.

With paper-making machines of known types, e.g. those which roll at speeds of 1800—2500 ft./min. and produce approximately 5—7 tons per hour depending on the sheet thickness, width of sheet and the specific gravity of the solids, it is possible to produce 120—160 tons of dried sludge product with one machine in a 24-hour period. This coupled with the fact that the product is commercially useful, is a significant step forward in the art.

The product produced as described above contains humus, an organic degradation product resembling mulch or soil; cellulose and hemi-cellulose compounds; starches; fatty acid compounds and derivatives; amino acids and other nitrogen and sulfur compounds; saccharides; and other solid hydrocarbons and carbohydrates.

While it is preferred to operate at a dilution of about 1 percent, the oxidation step may be carried out at any concentration up to about 5 percent. However, at concentrations above 1 percent the increased viscosity tends to inhibit intimate mixing of the reagents thus causing possible waste of oxidants and slowing of the process. Further, for practical operation of the paper-making machine very rapid filtration must occur, i.e. in a matter of seconds, and thus a slurry of about 1 percent solids content is preferred. The optimum dilution, of course, depends upon the nature of the slurry, including the particle size of the solids, viscosity of the slurry, and the mesh size of the paper-making machine. It must be remembered that quick drying of the product is necessary for optimum operation. Inasmuch as drying should be almost instantaneous on the steam heated rollers, the sheet of product should not be too thick, since this would retard removal of moisture.

It will be apparent to those skilled in the art that the process of the present invention would also be useful in disposing of wastes from food processing and canning, paper and pulp manufacture, and pharmaceutical manufacturing, particularly antibiotics, among other industries.

I claim:

1. A method for avoiding pollution of the environment by conversion of raw, undigested sludge derived from sewage and industrial wastes to a dry, sterile, odorless, paperlike sheet product useful as such which comprises, in combination, the steps of:

a. diluting said undigested raw sludge to form a slurry containing about 1 to 5 percent solids by weight;
   b. substantially completely oxidizing said slurry in a period of about 10 minutes while mixing at high speed, said oxidation being accomplished by introducing caustic soda and chlorine gas into said slurry in amounts sufficient to react to produce about 1,000 mg./l. of sodium hypochlorite oxidizing agent;
   c. rapidly filtering said oxidized slurry on a high speed paper-making machine to form a wet fibrous sheet;
   d. rapidly drying said wet sheet on heated drying rolls of said paper-making machine; and
   e. winding the resulting dry material into rolls of paperlike product.